United States Patent [19]

Takegawa et al.

[11] Patent Number: 5,267,450
[45] Date of Patent: Dec. 7, 1993

[54] AIR CONDITIONING APPARATUS

[75] Inventors: Hirozo Takegawa, Sakai; Tomoko Kitamura, Moriguchi; Hisashi Kodama, Ikoma; Hiroyuki Miyamoto, Hirakata, all of Japan

[73] Assignees: Matsushita Electric Ind. Co., Ltd.; Matsushita Seiko Co., Ltd., Osaka, Japan

[21] Appl. No.: 915,550

[22] Filed: Jul. 20, 1992

[51] Int. Cl.$^5$ .......................... F25B 13/00; F25B 5/02
[52] U.S. Cl. .................................... 62/176.2; 62/156; 62/160; 62/180; 62/199
[58] Field of Search ............... 62/160, 197, 198, 199, 62/200, 150, 151, 152, 156, 180, 181, 183, 184, 186, 324.1, 324.6, DIG. 1, 176.6, 176.1, 176.2; 165/56, 57; 237/2 B

[56] References Cited

U.S. PATENT DOCUMENTS

| | | | |
|---|---|---|---|
| 2,637,175 | 5/1953 | Alexander | 62/200 X |
| 4,938,032 | 7/1990 | Mudford | 62/160 |
| 4,939,910 | 7/1990 | Umezu et al. | 62/186 X |
| 5,086,626 | 2/1992 | Iida | 62/184 |

FOREIGN PATENT DOCUMENTS 0210547  9/1988  Japan .................................. 62/160

*Primary Examiner*—Harry B. Tanner
*Attorney, Agent, or Firm*—Wenderoth, Lind & Ponack

[57] ABSTRACT

An air conditioning apparatus including an indoor device having a first heat exchanger, a second heat exchanger, and a radiant panel. Air circulation mode is switched to radiant mode when a room temperature has reached a temperature set by a user. Refrigerant is changeably circulated through the first and second heat exchangers in a cooling operation so that dew is not formed on the radiant panel.

3 Claims, 4 Drawing Sheets

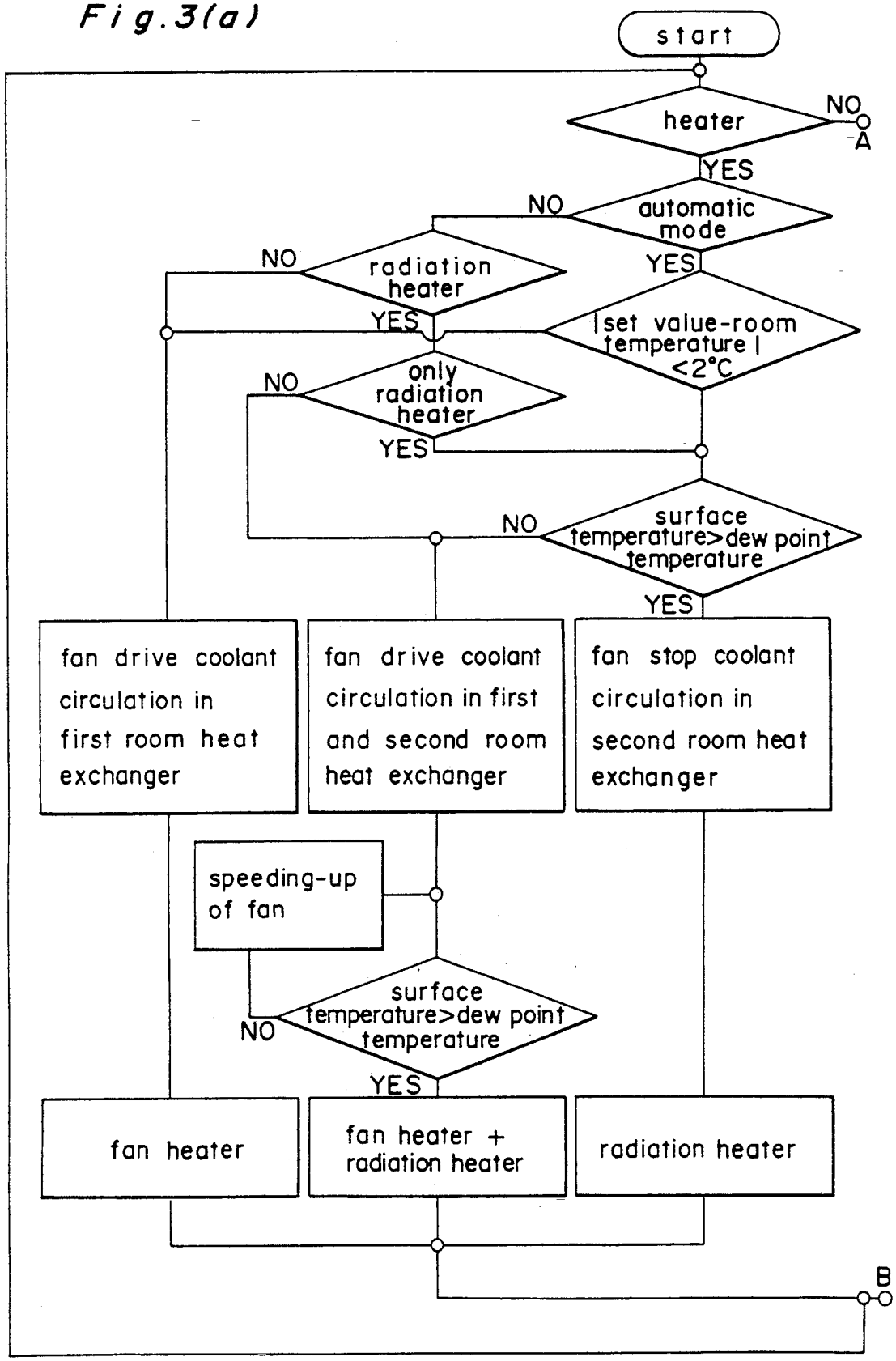

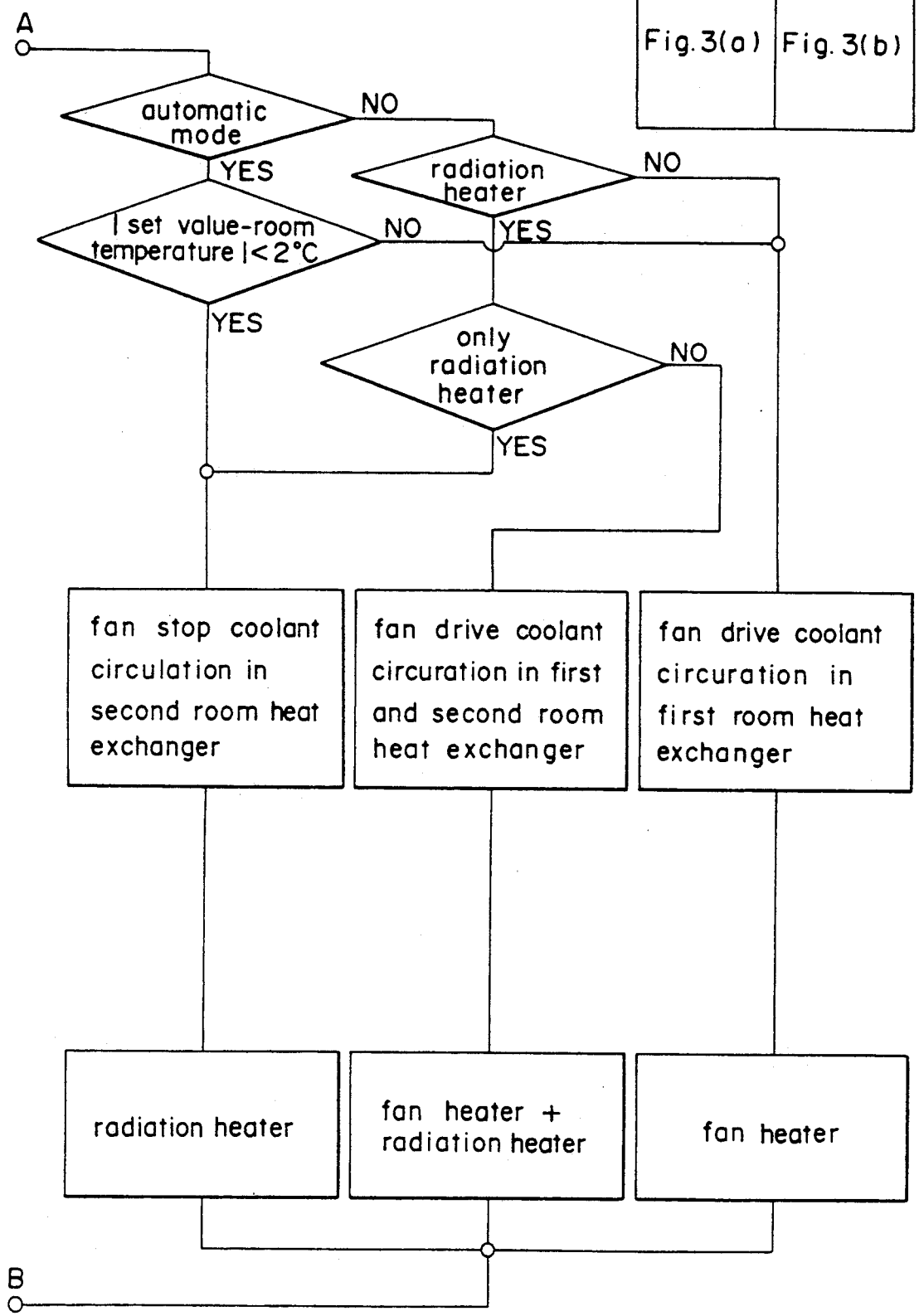

AIR CONDITIONING APPARATUS

BACKGROUND OF THE INVENTION

1. Field of the Invention

The present invention relates to an air conditioning apparatus.

2. Description of the Related Arts

In recent years, there has been a growing demand for the development of an air conditioning apparatus capable of accomplishing favorable air-conditioning.

Most conventional air conditioning apparatuses of a heat pump type adopt a convection system. That is, in order to obtain a room temperature set by a user and maintain the obtained set room temperature, a heat exchanger of an indoor air conditioner transfers heat therefrom to room air and vice versa. Air cooled or heated is circulated in the room.

These conventional air conditioning apparatuses accomplishes a favorable air-conditioning in rise time in which the room temperature is much higher than the set temperature, namely, the comfortable temperature, namely, 24° to 25° C. in summer or much lower than the comfortable temperature, namely, 21° to 22° C. in winter, but may give discomfort to the user in the vicinity of the set temperature, namely, the comfortable temperature because the user is subjected to the flow of air cooled or heated for a long time.

Some conventional air conditioning apparatuses adopt radiant system of cooling or heating room air by cooling or heating the ceiling, the floor or the wall of the room.

The radiant system accomplishes a favorable air-conditioning in the vicinity of the set temperature; does not subject the user to the flow of air cooled or heated; and makes the temperature of the room air uniform.

But the radiant system has disadvantages in that a thermal load is great in rise time and it takes longer than convection system to attain the set temperature. In addition, the radiant system causes dew to be formed on the surface of a cooling radiant panel. That is, when air of a high temperature and a high humidity strikes the surface of the cooling radiant panel in summer, moisture in air is condensed to form water droplets thereon. For example, under the circumstances of a high temperature of 30° C. and a high humidity of 60%, dew is formed on the surface of the cooling radiant panel, the temperature of which is 20° C. Therefore, it is necessary to use a dehumidifier additionally so as to reduce the humidity when the indoor air is radiantly cooled. Dew is still formed thereon or the indoor air becomes too dry if the matching between the temperature of the dehumidifier and that of the cooling radiant panel is not appropriately controlled.

SUMMARY OF THE INVENTION

It is an object of the present invention to provide an air conditioning apparatus which makes a user feel thermally comfortable not only in rise time but also in the vicinity of a temperature set by a user even though the user is in a room for a long time.

It is another object of the present invention to provide an air conditioning apparatus capable of maintaining a proper humidity without generating dew on a cooling radiant panel when the air of the room is radiantly cooled.

In accomplishing these and other objects of the present invention, there is provided an air conditioning apparatus comprising: an outdoor device having a compressor, a heat exchanger, and an expansion valve; an indoor device having a fan, a first heat exchanger, a second heat exchanger, a change-over valve for switching the flow passage of refrigerant which is to flow through the first heat exchanger and the second heat exchanger, and control means for controlling the switching operation of the change-over valve; and room temperature-detecting means for detecting the temperature of a room in which the indoor device is installed. In the above construction, the control means controls the circulation of the refrigerant according to the output of the room temperature-detecting means so as to circulate the refrigerant through the first heat exchanger and/or the second heat exchanger.

The air conditioning may further comprise: dew point-detecting means for detecting the dew point of room air; and surface temperature-detecting means for detecting the surface temperature of the second heat exchanger. The control means controls the number of rotations of the fan according to the output of the dew point-detecting means and that of the surface temperature-detecting means so as to flow the refrigerant in the order from the first heat exchanger to the second heat exchanger by operating the change-over valve.

In the air conditioning apparatus, the first heat exchanger transfers heat therefrom to the room air and vice versa; and the second heat exchanger transfers heat therefrom to a radiant panel of the indoor device and vice versa.

In the air conditioning apparatus, the control means switches the circulation of the refrigerant which is to flow through the first heat exchanger and/or the second heat exchanger in response to a signal outputted from a manual switch.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3(a) and 3(b) are a flowchart of a program incorporated in a control means of the air conditioning apparatus.

FIG. 3 is a chart showing how FIGS. 3(a) and 3(b) fit together.

DETAILED DESCRIPTION OF THE INVENTION

An air conditioning apparatus according to an embodiment of the present invention is described below with reference to FIGS. 1, 2, 3(a) and 3(b).

Figure 1:
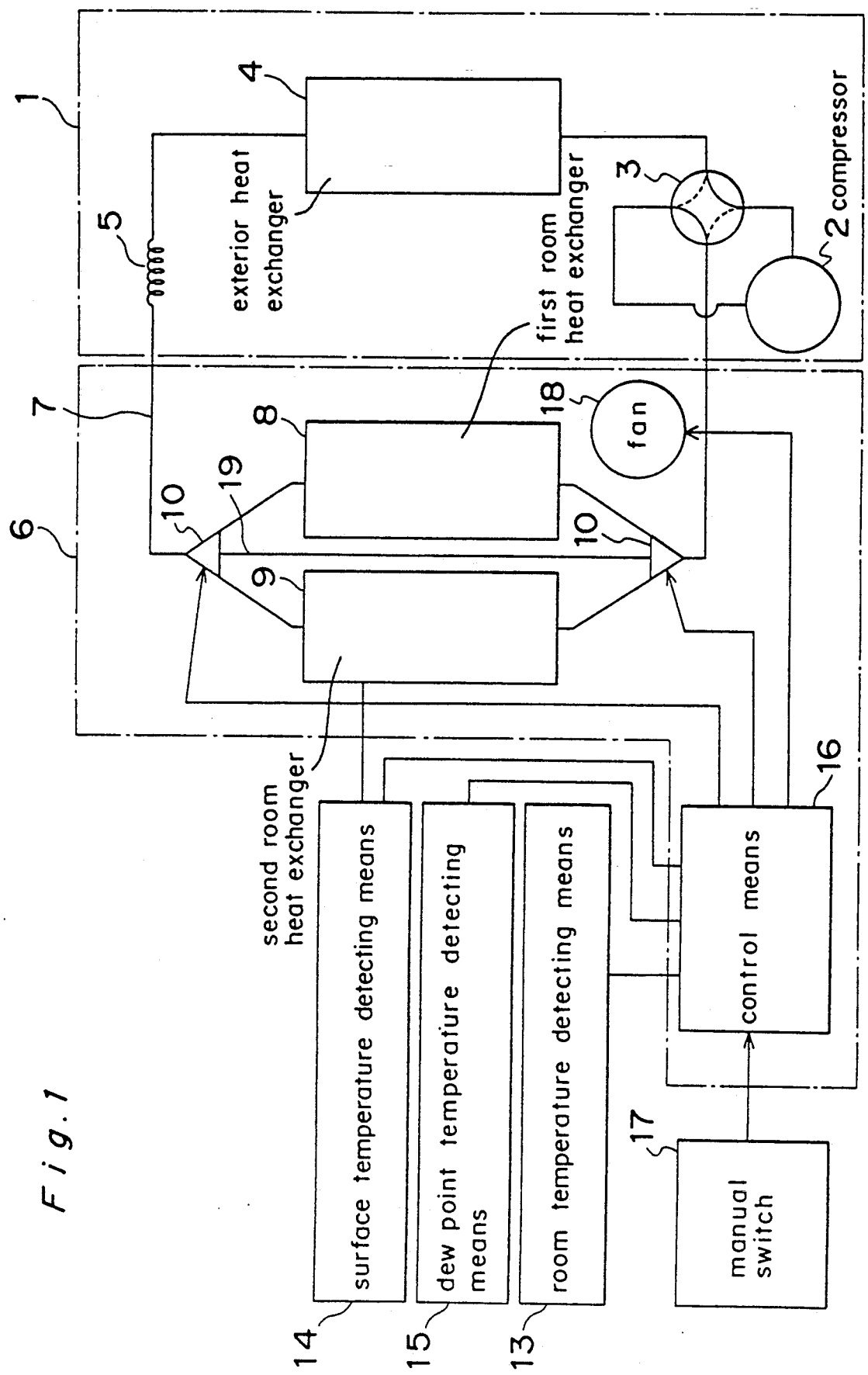
FIG. 1 is a construction view showing the system of an air conditioning apparatus according to an embodiment of the present invention.
Figure 2:
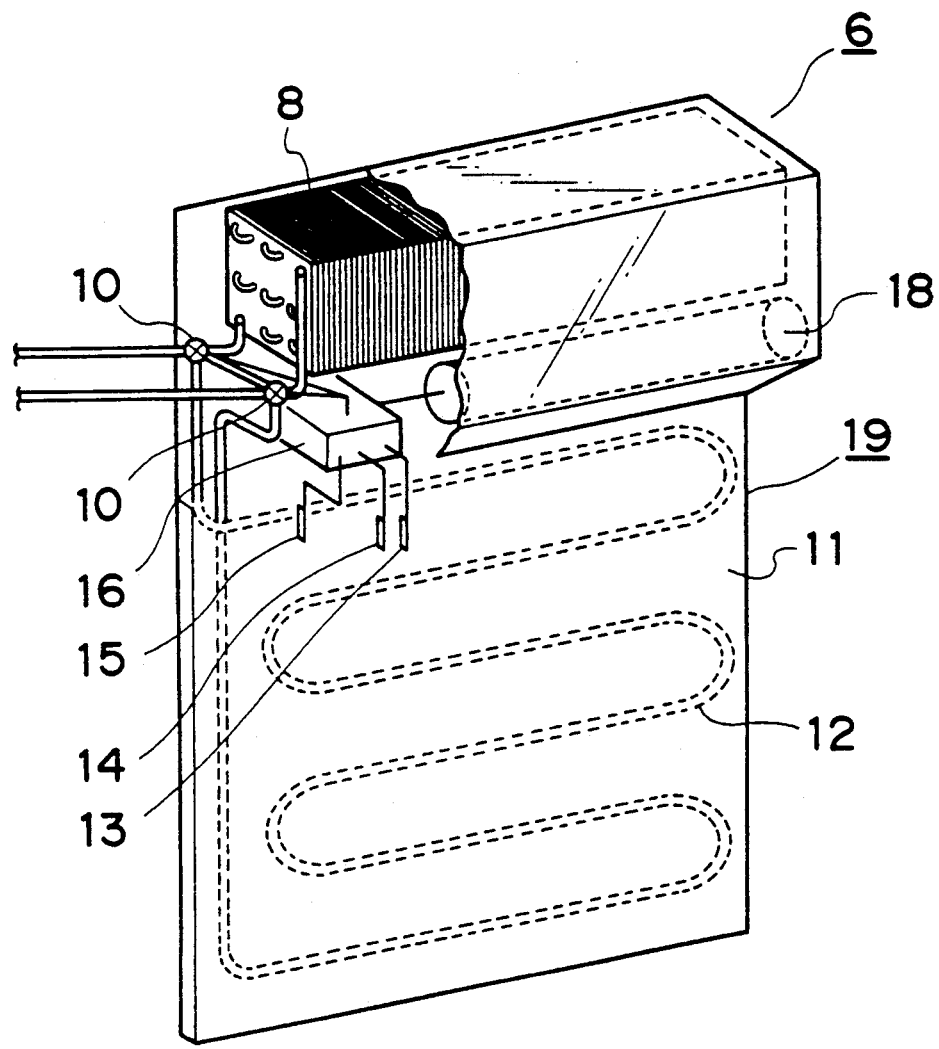
FIG. 2 is a perspective view showing first and second indoor heat exchangers of the air conditioning apparatus of FIG. 1.

As shown in FIG. 1, an outdoor air conditioning device 1 comprises a compressor 2; a four-way valve 3; a heat exchanger 4; and an expansion valve 5. The air conditioning device 1 is connected with an room air conditioning device 6 by a pipe 7, thus forming a closed circuit in which refrigerant is enclosed. The room air conditioning device 6 comprises a first heat exchanger 8 comprising a fin tube; a second heat exchanger 9; and a change-over valve 10. The second heat exchanger 9 transfers heat therefrom to a radiant panel 11 and vice versa through a refrigerant pipe 12 installed in the radiant panel 11. The change-over valve 10 is connected with the first heat exchanger 8 or the second heat exchanger 9 so that the refrigerant flows through the first heat exchanger 8 and/or the second heat exchanger 9. A room temperature-detecting means 13 comprising a thermistor detects the temperature of a room in which the room air conditioning device 6 is installed. The output of the room temperature-detecting means 13 is inputted to a control means 16. A surface temperature-detecting means 14 comprising a thermistor detects the surface temperature of the radiant panel 11. A dew point-detecting means 15 detects the dew point of the room by means of an electric moisture-measuring method. According to this method, an alternating voltage is applied to an electrode in order to measure heat generated in a varied degree with the change of electric conductivity caused by the quantity of moisture by means of a thermoresistance. The output of the surface temperature-detecting means 14 and that of the dew point-detecting means 15 are inputted to the control means 16. In response to a signal outputted from a manual switch 17, the control means 16 switches the refrigerant circulation through the first heat exchanger 8 and/or the second heat exchanger 9. The control means 16 decides whether an automatic mode or manual mode has been selected as the operation mode, thus switching the change-over valve 10 according to the output of the room temperature-detecting means 13 or the output of the manual switch 17 so that the refrigerant flows through the first heat exchanger 8 and/or the second heat exchanger 9 and rotating or stopping a fan 18. The control means 16 incorporates a temperature comparator for comparing the surface temperature of the radiant panel 11 detected by the surface temperature-detecting means 14 with the dew point detected by the dew point-detecting means 15. Based on the result obtained by the temperature comparator, the control means 16 switches the change-over valve 10 so that the refrigerant flows only through the second heat exchanger 9 or through the first heat exchanger 8 and the second heat exchanger 9 via a refrigerant pipe 19. In addition, the control means 16 drives or stops the fan 18 based on the result obtained by the temperature comparator.

The operation of the air conditioning apparatus having the above-described construction is described below with reference to a flowchart of FIGS. 3(a) and 3(b).

First, the cooling operation of the apparatus is described. In the cooling operation, the refrigerant flows through the four-way valve 3 as shown by a solid line of FIG. 1.

First, the control means 16 decides whether or not the automatic mode has been selected as the operation mode. If yes, the control means 16 compares a temperature set by a user with a room temperature detected by the room temperature-detecting means 13. If the room temperature is higher than the set temperature by more than a predetermined degree, for example, 2° C., the change-over valve 10 is operated so that the refrigerant flows through only the first heat exchanger 8 and in addition, the fan 18 is driven to circulate cooled air in the room. In this manner, the apparatus cools the room air rapidly toward the set temperature by circulating cooled air in the room.

If the room temperature is higher than the set temperature within the predetermined degree, for example, 2° C., or has fallen as a result of the circulated cooled air, but is still higher than the set temperature within the predetermined degree, the temperature comparator of the control means 16 compares the surface temperature of the radiant panel 11 and the dew point of the room air with each other. If the former is higher than the latter, there is no possibility that dew is distilled on the surface of the radiant panel 11. Therefore, the change-over valve 10 is switched so that the refrigerant flows through only the second heat exchanger 9, and the fan 18 is stopped to cool the room air radiantly because the room temperature has approached the set temperature. Thus, the user is not subjected to the flow of the heated air.

The control to be performed when the surface temperature of the radiant panel 11 is lower than the dew point of the room air is described below.

If the room temperature is 30° C., the dew point-detecting means 15 detects that the dew point is 18.2° C. If the surface temperature of the radiant panel 11 is 18.2° C. or lower than that at this time, according to the instruction of the control means 16, the change-over valve 10 is switched so that the refrigerant flows through the first heat exchanger 8, the pipe 19 connecting the first heat exchanger 8 and the second heat exchanger 9 with each other, and then, the second heat exchanger 9, and the fan 18 is driven. Consequently, in the first heat exchanger 8, heat is transferred between the refrigerant and the room air. As a result, the temperature of the refrigerant becomes higher, thereby increasing the surface temperature of the radiant panel 11. Then, the temperature comparator compares the surface temperature of the radiant panel 11 and the dew point with each other. If the latter is higher than the former, an invertor is operated to change the number of rotations of the fan 18 according to the difference in the temperature between the two. In this manner, the control means 16 controls the surface temperature of the radiant panel 11 so that it is always higher than the dew point of the room air and therefore, the dew is not formed on the surface of the radiant panel 11. In addition, the difference between the surface temperature of the radiant panel 11 and the dew point of the room air is maintained within a predetermined degree. Therefore, the room air does not become extremely dry.

If the manual mode is selected as the operation mode, the control means 16 decides whether or not radiant cooling mode has been selected. If no, the change-over valve 10 is switched from the previous position so that the refrigerant flows through the first heat exchanger 8, and the fan 18 is driven to circulate the cooled air in the room. If the radiant cooling mode has been selected, the control means 16 decides whether or not the circulation cooling mode has been also set. If only the radiant cooling mode is set, similar to the automatic mode, the temperature comparator compares the surface temperature of the radiant panel 11 and the dew point of the room air. Similar to the automatic mode, the switching of the change-over valve 10 and the drive of the fan 18 as well as the stop thereof are controlled according to the temperature difference between the two.

If it is decided that the radiant cooling mode and the circulation cooling mode are simultaneously set, according to the instruction of the control means 16, the change-over valve 10 is switched from the previous position so that the refrigerant flows through the first heat exchanger 8 and the second heat exchanger 9 via the pipe 19, and the fan 18 is driven. Then, similar to the automatic mode, the comparator compares the surface temperature of the radiant panel 11 and the dew point of the room air with each other.

Next, the heating operation of the air conditioning apparatus is described below. In the heating operation, the refrigerant flows through the four-way valve 3 as shown by a dotted line of FIG. 1. First, the control means 16 decides whether or not the automatic mode has been selected. If yes, the control means 16 compares a set temperature with a room temperature detected by the room temperature-detecting means 13. If the room temperature is lower than the set temperature by more than a predetermined degree, for example, 2° C., the change-over valve 10 is switched from the previous position so that the refrigerant flows only through the first heat exchanger 8 and in addition, the fan 18 is driven to circulate heated air in the room. In this manner, the apparatus heats the room air rapidly toward the set temperature by circulating the heated air.

If the room temperature is lower than the set temperature within the predetermined degree, for example, 2° C., or has risen as a result of the circulation of heated air, but is still lower the set temperature within the predetermined degree, the room air is radiantly heated by switching the change-over valve 10 so that the refrigerant flows through only the second heat exchanger 9. This is because the room temperature has approached the set temperature. In this manner, the user is not subjected to the flow of the heated air.

If the manual mode is selected as a result of the operation of the manual switch 17, the control means 16 decides whether or not radiant heating mode has been selected. If no, heated air is circulated in the room by switching the change-over valve 10 so that the refrigerant flows through only the first heat exchanger 8. If the radiant heating mode has been selected, the control means 16 decides whether only the radiant heating mode has been selected or both the radiant heating mode and the circulation heating mode have been set. If it is decided that only the radiant heating mode has been set, the room air is radiantly heated by switching the change-over valve 10 so that the refrigerant flows through only the second heat exchanger 9 and stopping the operation of the fan 18.

If it is decided that the radiant heating mode and the circulation heating mode have been simultaneously set, according to the instruction of the control means 16, the fan 18 is driven and the change-over valve 10 is switched so that the refrigerant flows through both the first heat exchanger 8 and the second heat exchanger 9. Since there is no possibility that dew is not formed on the surface of the radiant panel 11, the refrigerant may flow in the order from the first heat exchanger 8 to the second heat exchanger 9 and vice versa or the change-over valve 10 may be switched from the previous position so as to flow the refrigerant through both heat exchangers 8 and 9 simultaneously.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An air conditioning apparatus comprising:
   an outdoor device having a compressor, an outdoor heat exchanger and an expansion valve;
   an indoor device having a fan, a first indoor heat exchanger, a second indoor heat exchanger and a change-over valve for selectively switching a flow passage of a refrigerant through said first indoor heat exchanger and said second indoor heat exchanger;
   a dew point detecting means for detecting a dew point temperature of room air in which said indoor device is installed;
   a surface temperature detecting means for detecting a surface temperature of said second indoor heat exchanger; and
   a control means for controlling a rotation number of said fan and a switching of said change-over valve from a flow passage through said first indoor heat exchanger to a flow passage through said second indoor heat exchanger according to the dew point temperature and the surface temperature respectively detected by said dew point detecting means and said surface temperature detecting means.

2. An air conditioning apparatus as claimed in claim 1, wherein said first indoor heat exchanger transfers heat to and from the room air, and wherein said second indoor heat exchanger transfers heat to and from a radiant panel of said indoor device.

3. An air conditioning apparatus as claimed in claim 1, further comprising a manual switch coupled to said control means, wherein said control means is responsive to said manual switch to control a circulation of the refrigerant by the switching of said change-over valve.

* * * * *